: US009605649B2

(12) United States Patent
Mehdi

(10) Patent No.: US 9,605,649 B2
(45) Date of Patent: Mar. 28, 2017

(54) WIND TURBINE ROTOR BLADE WITH A PROFILE WITH A THICK TRAILING EDGE

(71) Applicant: Nordex Energy GmbH, Hamburg (DE)

(72) Inventor: Doosttalab Mehdi, Norderstedt (DE)

(73) Assignee: Nordex Energy GmbH, Hamburg (DE)

( * ) Notice: Subject to any disclaimer, the term of this patent is extended or adjusted under 35 U.S.C. 154(b) by 807 days.

(21) Appl. No.: 13/930,698

(22) Filed: Jun. 28, 2013

(65) Prior Publication Data

US 2014/0003957 A1 Jan. 2, 2014

(30) Foreign Application Priority Data

Jun. 28, 2012 (EP) .................................. 12004850

(51) Int. Cl.
*F03D 1/06* (2006.01)

(52) U.S. Cl.
CPC .......... *F03D 1/0641* (2013.01); *F03D 1/065* (2013.01); *F03D 1/0633* (2013.01); *F03D 1/0675* (2013.01); *F05B 2240/30* (2013.01); *Y02E 10/721* (2013.01)

(58) Field of Classification Search
CPC .... F03D 1/0633; F03D 1/0641; F03D 1/0675; F03D 1/0683; F05B 2240/30; F05B 2260/96; F05D 2240/304
See application file for complete search history.

(56) References Cited

U.S. PATENT DOCUMENTS

| 5,058,837 | A   | * | 10/1991 | Wheeler ................. B64C 23/06 244/198 |
|-----------|-----|---|---------|---------------------------------------------|
| 7,566,203 | B2  | * | 7/2009  | Moser ................... F03D 1/0633 416/235 |
| 7,585,157 | B2  |   | 9/2009  | Quell et al.                                |
| 7,918,653 | B2  |   | 4/2011  | Standish et al.                             |
| 7,976,283 | B2  | * | 7/2011  | Huck ..................... F03D 1/0633 415/119 |
| 8,016,568 | B2  |   | 9/2011  | Fritz                                       |
| 8,414,261 | B2  | * | 4/2013  | Bonnet ................. F03D 1/0641 415/119 |
| 2011/0211954 | A1 |   | 9/2011  | Bonnet                                      |
| 2012/0051936 | A1 | * | 3/2012  | Eisenberg ............. F03D 1/0633 416/235 |

FOREIGN PATENT DOCUMENTS

| DE | EP 1112928 A2 * | 7/2001 | ............... B64C 9/18 |
| DE | 102010026588 A1 * | 1/2012 | .......... F03D 1/0641 |
| DK | WO 2011042528 A1 * | 4/2011 | .......... F03D 1/0675 |
| KR | 10-2010-0079522 A | 7/2010 | |
| WO | WO 2011/068405 A1 | 6/2011 | |

* cited by examiner

*Primary Examiner* — Richard Edgar
*Assistant Examiner* — Jesse Prager
(74) *Attorney, Agent, or Firm* — Walter Ottesen, P.A.

(57) ABSTRACT

A wind turbine rotor blade has a longitudinal axis, a blade root, a blade tip, a pressure side, a suction side and an aerodynamic profile which, in a longitudinal section of the rotor blade, has a profile chord and a thick trailing edge. The rotor blade includes a multiplicity of flow deflection elements which are arranged on the thick trailing edge and have respective inflow surfaces which are shaped and arranged such that a radial flow running in the direction from the blade root toward the blade tip is diverted by the inflow surface in the direction of the profile chord.

15 Claims, 3 Drawing Sheets

WIND TURBINE ROTOR BLADE WITH A PROFILE WITH A THICK TRAILING EDGE

CROSS REFERENCE TO RELATED APPLICATION

This application claims priority of European patent application no. 12004850.9, filed Jun. 28, 2012, the entire content of which is incorporated herein by reference.

FIELD OP THE INVENTION

The invention relates to a wind turbine rotor blade having a. longitudinal axis, a blade root, a blade tip, a pressure side, a suction side and an aerodynamic profile which, in a longitudinal section of the rotor blade, has a profile chord and a thick trailing edge.

BACKGROUND OF THE INVENTION

In the case of wind turbine rotor blades having a so-called thick trailing edge, the trailing edge of the rotor blade is, in contrast to a thinly tapering profile, formed not by a line but rather by a rear surface. If the rotor blade is viewed in cross section, that is to say in profile, the pressure side and suction side do not merge at a point at their rear edges, but rather the rear ends of the pressure and suction sides have a spacing to one another, which is bridged by a surface substantially perpendicular to the profile chord. From an aerodynamic aspect, a thinly tapering trailing edge is generally advantageous because the air flowing past the pressure side and suction side can flow smoothly off the trailing edge without any relatively intense turbulence necessarily occurring. In the past, it has therefore been sought to design the trailing edges of rotor blades to be as thin as possible, wherein a manufacturing limit lies in the range of approximately 1 mm to 3 mm.

It has, however, been found that the use of relatively thick trailing edges can be advantageous in particular from a structural aspect in the blade root region. It is thus possible to design the rotor blade to be more lightweight and to nevertheless realize a profile height required from a strength aspect. In the case of rotor blades for large wind turbines, it is today common to use aerodynamic profiles with thick trailing edges in a region close to the blade root. The aerodynamic performance of such profiles also has its benefits, in particular a higher lift coefficient, a steeper gradient of the lift curve and lower sensitivity of the lift coefficient, to the accumulation of dirt on the profile leading edge, in each case in relation to a profile with a thin trailing edge and identical profile thickness.

Known disadvantages of profiles with a thick trailing edge are however a greater flow resistance and more intense noise generation.

U.S. Pat. No. 7,585,157 discloses a rotor blade for a wind, turbine wherein an areal element which is oriented substantially in the flow direction projects from the suction side. The areal element is intended to counteract a transverse flow running from the blade root to the blade tip.

Publication KR 20100079522 A discloses a wind turbine rotor blade wherein it is sought to counteract a radial flow of the air along a surface of the rotor blade. The known rotor blade has a blade root section of circular cross section and an adjoining blade tip section. To prevent the radial flow, a partition wall is arranged on the pressure side between the blade root section and the blade tip section.

U.S. Pat. No. 7,918,653 discloses a wind turbine rotor blade having a rotor blade trailing edge assembly. To reduce the trailing edge noise, the thin trailing edge is terminated in a varied manner, for example using teeth of triangular form or bristles.

SUMMARY OF THE INVENTION

It is an object of the invention to improve the aerodynamic characteristics of a wind turbine rotor blade having a thick trailing edge.

The wind turbine rotor blade has a longitudinal axis, a blade root, a blade tip, a pressure side, a suction side and an aerodynamic profile which, in a longitudinal section of the rotor blade, has a profile chord and a thick trailing edge.

In the case of the invention, the wind turbine rotor blade has a multiplicity of flow deflection elements which are arranged on the thick trailing edge and have respective inflow areas. The inflow area is shaped and arranged such that a radial flow running in the direction from the blade root toward the blade tip is diverted by the inflow area in the direction of the profile chord.

The blade root is connected to a rotor hub and, for this purpose, may in particular have a flange and/or be provided with suitable fastening means. The longitudinal section, in which the aerodynamic profile with the thick trailing edge is formed, may extend over a length of, for example, 10% or more, or 20% or more, of the overall length of the rotor blade. The longitudinal section may be arranged close to the blade root, in particular between the blade root and the middle of the rotor blade. The thick trailing edge may have a height of for example 10 mm or more, 50 mm or more, 100 mm or more, or even 200 mm or more. The profile chord runs from a profile leading edge to a middle point of the thick trailing edge. The thick trailing edge is generally oriented perpendicular to the profile chord. In the region of the thick trailing edge, the wind turbine rotor blade has a rear surface which is, if appropriate, curved. The curvature of this surface may result in particular from the profile depth which varies over the length of the rotor blade. By contrast, in the direction of the profile height, the rear surface generally runs rectilinearly.

Where statements are made here and below with regard to the relative orientation of an element in relation to a surface, these also apply to curved surfaces, wherein the direction of the curved surface is considered at a reference point that arises from the context. The reference point may for example be the point at which the element in question makes contact with the surface.

The invention is based on the realization that the relatively high flow resistance of wind turbine rotor blades having a thick trailing edge is caused at least partially by a flow in the region of the thick trailing edge which is of areal form, specifically a flow in a radial direction, that is to say running from the blade root in the direction of the blade tip. This radial flow reduces the static pressure behind the rotor blade, resulting in an increased flow resistance. The radial flow that arises in the case of known rotor blades having a thick trailing edge will be explained briefly on the basis of FIG. 5, which shows a rotor blade of this type in a perspective view. At the front in FIG. 5 one can see a circular blade root with a multiplicity of fastening bolts for connection to a rotor hub. The blade tip of the rotor blade is situated at the top right in FIG. 5. It is possible co clearly see the areal, thick trailing edge which extends from the blade root in the direction of the blade tip. The radial flow occurring there is indicated by a plurality of short arrows.

The undesired radial flow is counteracted by the flow deflection elements provided on the thick trailing edge according to the invention. By contrast to the rotor blades described in the introduction in conjunction with the state of the art, the flow deflection elements are arranged not on the suction side but rather in the region of the thick trailing edge. In this way, the flow deflection elements can optimally counteract the increased flow resistance without significantly impairing the other aerodynamic characteristics of the rotor blade. Furthermore, according to the invention, the radial flow is deflected in a targeted manner in the direction of the profile chord by means of the inflow areas of the flow deflection elements. The air which initially flows in the radial direction along the thick trailing edge is thus deflected by the inflow areas at an angle of, for example, approximately 90°, such that the air flows rearward off the profile trailing edge, in the direction of the profile chord, and can merge with the air flows running over the pressure side and suction side. A smooth flow off the profile trailing edge is promoted in this way. Overall, the aerodynamic performance of the rotor blade is improved, wherein in particular the quotient of the lift and flow resistance can be increased.

In one embodiment, the inflow area is concavely curved. As a result, a radial flow that occurs can be deflected in a particularly effective manner in the direction of the profile chord, specifically by virtue of the flow being guided along the curved inflow area. Thereby, a continuous deflection of the flow can take place.

In one embodiment, the flow deflection elements extend over the entire height of the profile trailing edge. This may alternatively or additionally also apply to the associated inflow areas, the height of which may correspond to the height of the flow deflection elements. By means of flow deflection elements and/or inflow areas dimensioned in this manner, it is possible for the entire radial flow occurring at the profile trailing edge to be captured.

In one embodiment, the flow deflection elements have, on their side which, points towards the blade tip and which is situated opposite the inflow area, a planar surface which is arranged in the direction of the profile chord. As a result, undesired influences exerted by the flow deflection elements on the air flowing off along the pressure side and suction side can be minimized.

In one embodiment, the inflow area has a first section which is arranged in the direction of a surface of the profile trailing edge. In other words, the first section is arranged parallel to the areal profile trailing edge. This first section thus runs approximately at right angles to the profile chord. A radial flow flowing along the profile trailing edge in the direction of the blade tip will therefore readily flow along the first section of the inflow area and subsequently be deflected in the desired manner in the direction of the profile chord by further sections of the flow-off area.

In one embodiment, the first section of the inflow area adjoins the surface of the profile trailing edge with a smooth transition. As a result, undesired turbulence of the radial flow before the deflection by the inflow area is prevented, in particular in the region of steps or edges or sudden directional changes.

In one embodiment, the inflow area has a second section which is arranged at right angles to the longitudinal axis of the rotor blade. A surface normal of the second section runs in the direction of the longitudinal axis. As a result of this orientation of the second section of the inflow area, it is ensured that the air flowing off, which has previously passed the second section of the inflow area, flows off approximately in the direction of the profile chord. As viewed in the flow direction, the second section of the inflow area can form the rear end of the inflow area.

In one embodiment, the inflow area has a second section which is arranged at right angles to the surface of the profile trailing edge. A normal of the second section of the inflow area thus does not run necessarily parallel to the longitudinal axis of the rotor blade, but rather is inclined at an angle with respect thereto, corresponding to the angle between the areal profile trailing edge and the longitudinal axis. As a result of this configuration, the air flowing off over the second section of the inflow area will, under some circumstances, be deflected with slightly greater or slightly lesser intensity than would appear to be desirable for a flow-off in the direction of the profile chord. Nevertheless, an optimum effect can be generated in interaction with the flows running over the pressure side and suction side.

In one embodiment, the second section is adjoined by edges which extend from opposite sides of the second section in the direction of the blade root. Considering a cross section through the second section and the edges in a section plane arranged perpendicular to the profile chord, the second section and the two adjoining edges may in particular be of U-shaped form, with corners rounded to a greater or lesser extent. The edges can also be arranged so as to be inclined relative to the second section, for example at an angle of between 90° and 120°. The edges arranged at the second section of the inflow area counteract a lateral flow around the inflow area in the region of the second section and thus contribute to the radial flow being deflected in a desired manner in the direction of the profile chord.

In one embodiment, the inflow area of the flow deflection element has a concavely curved middle section between the first section and the second section. It is then possible for the flow to flow on and flow off rectilinearly along the first and second sections, which may be formed rectilinearly in the flow direction, and to be deflected primarily in the region of the middle section.

In one embodiment, the height of the inflow area and/or of the flow deflection element is constant over the length of the flow deflection element in the direction of the profile chord. The height of the flow deflection element or of the inflow area refers to the height in the direction of the profile height, that is to say perpendicular to the profile chord and perpendicular to the longitudinal axis of the rotor blade. The middle section may describe a quadrant. In the case of such a configuration, the flow deflection element, more specifically the inflow area, extends with a uniform height proceeding from the profile trailing edge. This has proven to be aerodynamically advantageous.

In one embodiment, the flow deflection elements are arranged with a spacing to one another in the range of 1 m to 4 m. It is, for example, possible for 3 to 15 flow deflection elements to be arranged along a 15 m long longitudinal section in which a wind turbine rotor blade has a thick trailing edge. The spacing between two flow deflection elements can be uniform or can vary over the longitudinal section. In particular, the spacing may vary in dependence upon the height of the profile trailing edge, such that, in the case of particularly large profile trailing edges, greater spacings between two flow deflection elements are provided close to the blade root than are provided in the region of lesser heights of the profile trailing edge, further toward the blade tip.

In one embodiment, the depth of the flow deflection elements is 0.5 times to 1.5 times their height. This configuration has proven to be aerodynamically advantageous.

The depth of the flow deflection elements is preferably in the range from 0.6 times to 1.2 times their height.

In one embodiment, the flow deflection elements are manufactured from a plastics material. These flow deflection elements can be produced together with the wind turbine rotor blade or can be prefabricated and subsequently connected to the rotor blade. The plastics material may in particular be a fiber-reinforced plastics material, such as is also used for rotor blade half-shells.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
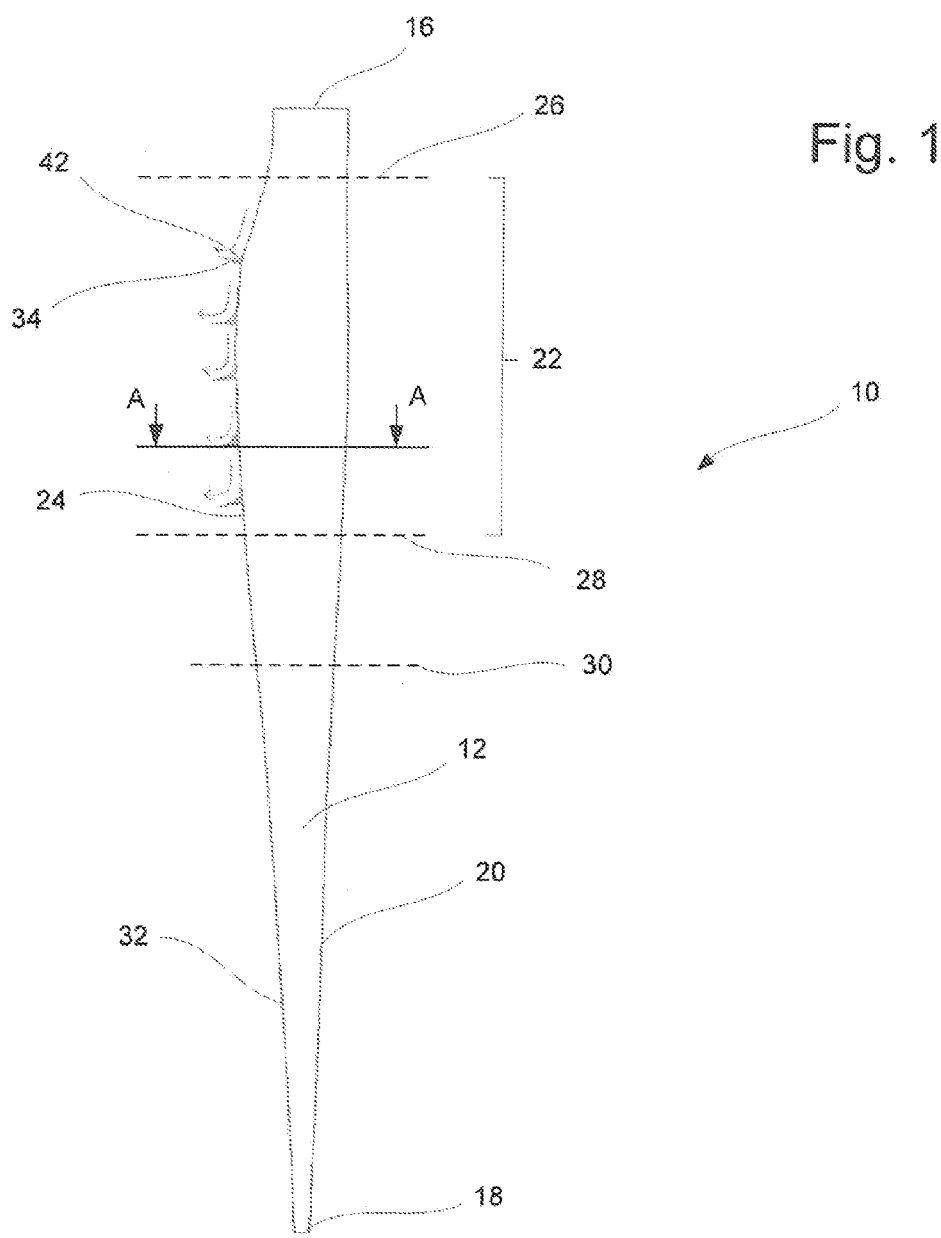
FIG. 1 shows a wind turbine rotor blade according to the invention in a plan view of the suction side.

FIG. 1 shows a wind turbine rotor blade 10 according to the invention in a plan view of the suction side 12. The pressure side of the rotor blade 10 is situated on the side facing away from the viewer. The rotor blade 10 furthermore has a blade root 16 and a blade tip 18 as well as a profile leading edge 20. In the region of the blade root 16, the rotor blade 10 is of circular cross section and is provided for connection to a rotor hub.

In a longitudinal section 22, the rotor blade 10 has a profile with a thick trailing edge 24. The longitudinal section 22 extends from a first longitudinal position 26 to a second longitudinal position 28. The first longitudinal position 26 is arranged close to the blade root 16 but spaced apart therefrom. The second longitudinal position 28 is arranged further toward the blade tip than the first longitudinal position 26, but still before the middle 30 of the rotor blade 10 as viewed from the blade root 16. The rotor blade 10 has a thin trailing edge 32 between the second longitudinal position 28 and the blade tip 18.

Within the longitudinal section 32, the rotor blade 10 has a multiplicity of flow deflection elements 34. Each flow deflection element 34 has an inflow area 42 via which a radial flow running from the blade root 16 toward the blade tip 18 is deflected in the direction of the profile chord 36 (see FIG. 2), as indicated by the curved arrows close to each flow deflection element 34. The profile chord 36 is not shown in FIG. 1. The profile chord, in any profile, runs rectilinearly from the profile leading edge 20 to the profile trailing edge, and in the case of a profile with a thick trailing edge 24, runs to the middle of the thick trailing edge 24. This is illustrated in FIG. 2 by way of example for the cross section at chat longitudinal position of the wind turbine rotor blade 10 from FIG. 1 which is denoted by A-A.

Figure 2:
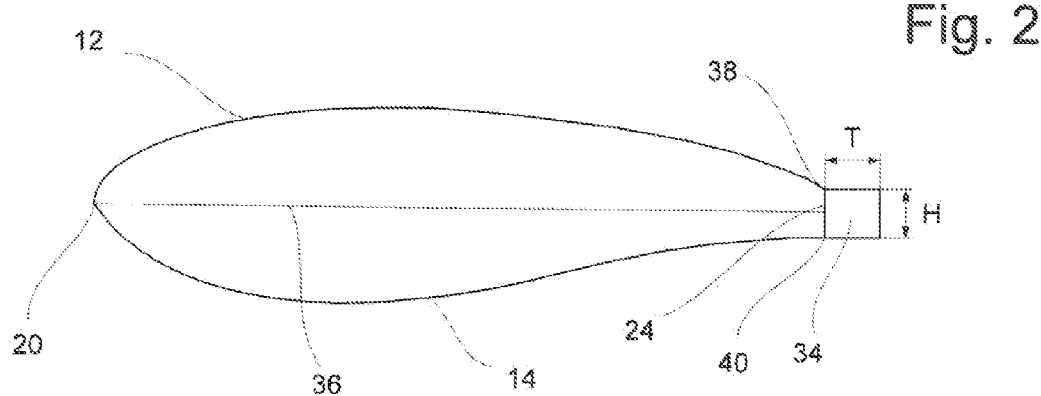
FIG. 2 shows a cross section through the wind turbine rotor blade of FIG. 1 at the position denoted by A-A.

In FIG. 2, the profile chord is denoted by the reference numeral 36. The profile chord 36 runs from the profile leading edge 20 to the middle of the thick trailing edge 24. Likewise illustrated are the suction side 12 of the profile, which runs in convexly curved fashion from the profile leading edge 20 to a rear end point 38 of the suction side 12, and the pressure side 14, which likewise begins at the profile leading edge 20 and leads from there with an initially convex, then concave curvature to the rear end point 40 of the pressure side 14. The end points 38, 40 are connected to one another by the thick trailing edge 24. A flow deflection element 34 is arranged directly on the thick trailing edge 24. It is possible to see the height H of the flow deflection element 34, this height being equal to the height of the thick trailing edge, and the depth T of the flow deflection element 34, this depth exceeding the height H by a factor of approximately 1.2.

Figure 3:
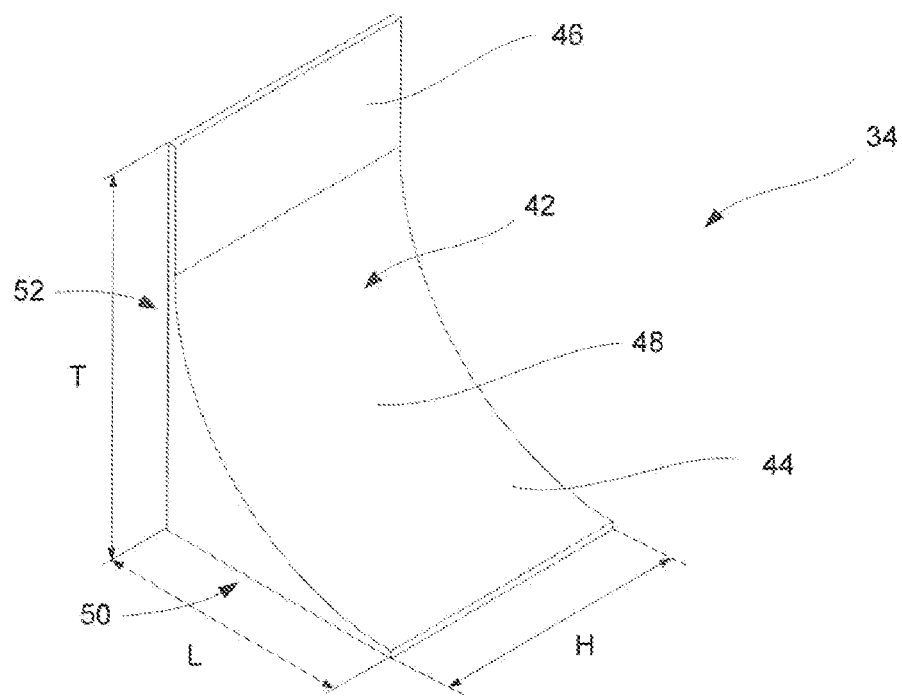
FIG. 3 shows a flow deflection element in a perspective view.

FIG. 3 illustrates one of the flow deflection elements 34 from FIGS. 1 and 2 in a perspective view. The view is directed toward the inflow area 42, which has a concavely curved design. The inflow area 42 has a first section 44 and a second section 46. Between the first section 44 and the second section 46 there is arranged a concavely curved middle section 48 which leads with a uniform curvature from the first section 44 to the second section 46. The lower side 50, which faces away from the viewer in FIG. 3, of the flow deflection element 34 has a height H and has a length L and is bonded to the thick trailing edge 24. The rear side 52, which likewise faces away from the viewer in FIG. 3, has a height H and a length corresponding to the depth T of the flow deflection element and points in the direction of the blade tip 18. The rear side 52 is formed by a planar surface, the surface normal of which is oriented parallel to the longitudinal axis of the rotor blade 10. The second section 46 also has the same orientation, such that the air flowing off the second section flows off in the direction of the profile chord 36. The first section 44 of the inflow area 42 is, by contrast, arranged parallel to the surface of the thick trailing edge 24.

Figure 4:
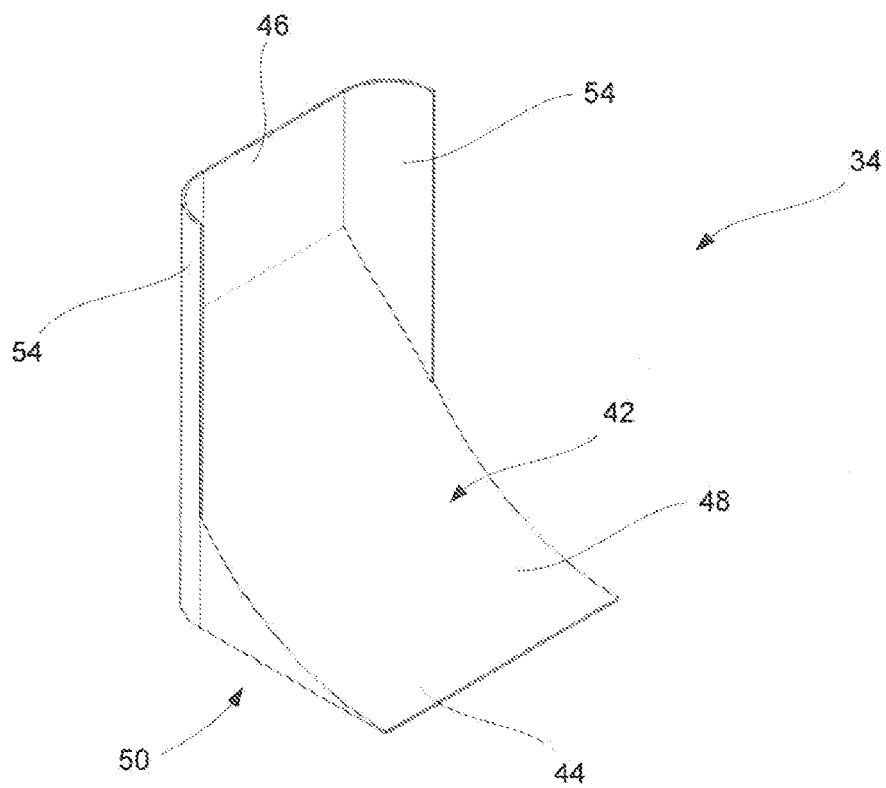
FIG. 4 shows a farther flow deflection element, likewise in a perspective view; and, FIG. 5 shows a conventional wind turbine rotor blade having a thick trailing edge.
Figure 5:
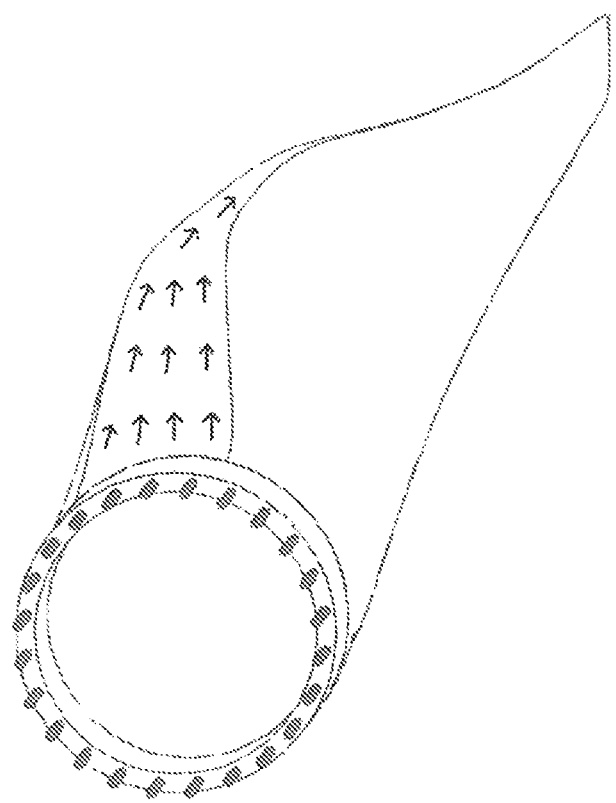

FIG. 4 shows a further exemplary embodiment of a flow deflection element 34. For corresponding components, use is made of the same reference numerals as those used in conjunction with the first exemplary embodiment. The flow deflection element 34 likewise has an inflow area 42 with a first section 44 and a second section 46, which are arranged correspondingly to the exemplary embodiment of FIG. 3. By contrast to FIG. 3, however, curved edges 54 extend from opposite sides of the second section 46 in the direction of the blade root. In a cross section through the flow deflection element 34 at the level of the second section 46 and in a plane parallel to the surface of the lower side 50 and to the surface of the thick trailing edge 24, the second section 46 of the inflow area 42 forms a u-shape together with the two edges 54.

It is understood that the foregoing description is that of the preferred embodiments of the invention and that various changes and modifications may be made thereto without departing from the spirit and scope of the invention as defined in the appended claims.

LIST OF REFERENCE NUMERALS USED

10 Wind turbine rotor blade
12 Suction side
14 Pressure side
16 Blade root
18 Blade tip
20 Profile leading edge
22 Longitudinal section
24 Thick trailing edge
26 First longitudinal position
28 Second longitudinal position
30 Middle
32 Thin trailing edge 34 Flow deflection element
36 Profile chord
38 Rear end point of the suction side
40 Rear end point of the pressure side
42 Inflow area
44 First section
46 Second section
48 Middle section
50 Lower side
52 Rear side
54 Edge

What is claimed is:

1. A wind turbine rotor blade defining a longitudinal axis, the wind turbine rotor blade comprising:
    a rotor blade body having a blade root, a blade tip, a pressure side, a suction side, a longitudinal section, and an aerodynamic profile;
    said aerodynamic profile having a height and defining a profile chord and having a thick trailing edge in said longitudinal section of the rotor blade;
    said thick trailing edge defining a rear surface running generally linearly in the direction of the height of said profile;
    a plurality of flow deflection elements arranged on said thick trailing edge of said aerodynamic profile;
    each of said flow deflection elements having an inflow surface facing toward said blade root and configured to divert a radial flow of air flowing from said blade root toward said blade tip in a direction of said profile chord laterally away from said trailing edge;
    each of said inflow surfaces having a first section arranged in a direction of said rear surface of said thick trailing edge toward said blade root;
    each of said inflow surfaces including a second section extending transversely to said first section; and,
    each of said inflow surfaces further including an arcuate section connecting said first and second sections for deflecting said radial flow of air from said first section to said second section from where said radial flow of air flows laterally away from said trailing edge.

2. The wind turbine rotor blade of claim 1, wherein each of said inflow surfaces are concavely curved.

3. The wind turbine rotor blade of claim 1, wherein:
    said thick trailing edge has a height (H); and,
    said flow deflection elements extend over the entire height (H) of said thick trailing edge.

4. The wind turbine rotor blade of claim 1, wherein:
    each one of said flow deflection elements has a first side directed toward said blade tip and disposed opposite the inflow surface corresponding thereto; and,
    said first side of each of said flow deflection elements has a planar first surface arranged in the direction of said profile chord.

5. The wind turbine rotor blade of claim 1, wherein:
    said rotor blade body defines said longitudinal axis; and,
    said second section is arranged at a right angle to said longitudinal axis.

6. The wind turbine rotor blade of claim 1, wherein said second section is arranged at a right angle to said rear surface of said thick trailing edge.

7. The wind turbine rotor blade of claim 5, wherein each of said inflow surfaces further has edge sections adjoining the second section thereof and extending from opposite sides of the second section in a direction of said blade root.

8. The wind turbine rotor blade of claim 6, wherein each of said inflow surfaces further has edge sections adjoining the second section thereof and extending from opposite sides of the second section in a direction of said blade root.

9. The wind turbine rotor blade of claim 5, wherein said arcuate section arranged between the first section and the second section is concavely curved.

10. The wind turbine rotor blade of claim 6, wherein said arcuate section is a concavely curved middle section arranged between the first section and the second section thereof.

11. The wind turbine rotor blade of claim 1, wherein:
    each of said flow deflection elements has a length (L); and,
    each of said inflow surfaces has a height (H) which is constant over the length (L) of the flow deflection element corresponding thereto.

12. The wind turbine rotor blade of claim 1, wherein each of said flow deflection elements has a length (L) and a height (H) which is constant over the length (L) thereof.

13. The wind turbine rotor blade of claim 1, wherein said flow deflection elements are arranged at a distance in the range of 1 m to 4 m from each other.

14. The wind turbine rotor blade of claim 1, wherein said flow deflection elements each have a height (H) and a depth (T) which is a factor of 0.5 to 1.5 greater than said height (H) thereof.

15. The wind turbine rotor blade of claim 1, wherein said flow deflection elements are made of a plastics material.

* * * * *

UNITED STATES PATENT AND TRADEMARK OFFICE
CERTIFICATE OF CORRECTION

| | | |
|---|---|---|
| PATENT NO. | : 9,605,649 B2 | Page 1 of 1 |
| APPLICATION NO. | : 13/930698 | |
| DATED | : March 28, 2017 | |
| INVENTOR(S) | : Doosttalab Mehdi | |

It is certified that error appears in the above-identified patent and that said Letters Patent is hereby corrected as shown below:

In the Specification

In Column 1:
Line 14: delete "." after -- a --.

In Column 5:
Line 21: delete "farther" and insert -- further -- therefor.
Line 48: delete "32" and insert -- 22 -- therefor.
Line 59: delete "chat" and insert -- that -- therefor.

In Column 6:
Line 46: delete "u-shape" and insert -- U-shape -- therefor.

Signed and Sealed this
Twenty-fourth Day of October, 2017

Joseph Matal
*Performing the Functions and Duties of the*
*Under Secretary of Commerce for Intellectual Property and*
*Director of the United States Patent and Trademark Office*